United States Patent [19]

Abe

[11] Patent Number: 5,238,888
[45] Date of Patent: Aug. 24, 1993

[54] CARBON MOLECULAR SIEVE

[75] Inventor: Kunio Abe, Bizen, Japan

[73] Assignee: Kuraray Chemical Co., Ltd., Bizen, Japan

[21] Appl. No.: 902,791

[22] Filed: Jun. 24, 1992

Related U.S. Application Data

[63] Continuation of Ser. No. 588,851, Sep. 27, 1990, abandoned.

[30] Foreign Application Priority Data

Oct. 2, 1989 [JP] Japan ................................. 1-258375
Sep. 4, 1990 [JP] Japan ................................. 2-234289

[51] Int. Cl.$^5$ .................. B01J 20/20; B01J 37/34; C01B 31/00; C01B 31/08
[52] U.S. Cl. ...................................... 502/5; 264/29.5; 427/249; 502/416; 502/417; 502/432; 502/522; 95/903
[58] Field of Search .............. 502/5, 522, 416–418, 502/432, 437, 4; 423/447.3; 264/29.5; 427/38, 39, 228, 249

[56] References Cited

U.S. PATENT DOCUMENTS 4,465,576 8/1984 Negishi .......................... 204/192 E
4,685,940 8/1987 Soffer et al. ..................... 423/447.1

FOREIGN PATENT DOCUMENTS 0146909 7/1985 European Pat. Off. .
30709 2/1984 Japan ................................. 423/447.3
236708 10/1988 Japan ................................. 423/447.3

OTHER PUBLICATIONS

Journal of Chromatography, vol. 286, No. 1, Mar. 1984, pp. 57–61, Elsevier Science Publishers B.V., Amsterdam, NL; N. Petsev et al.: "Plasma-modified thermal carbon black as a packing material for gas chromatography" *pp. 57–59*.

Primary Examiner—Paul E. Konopka
Attorney, Agent, or Firm—Oblon, Spivak, McClelland, Maier & Neustadt

[57] ABSTRACT

Provided are carbon molecular sieves produced by treating carbonacious materials with plasma. One of their most important uses is adsorbent for pressure swing adsorption processes, which are widely used for the separation of gases on industrial scales. The carbon molecular sieves meet the strong demand in this field where the performance of the adsorbent used governs the efficiency of gas separation.

The carbon molecular sieves of the present invention are particularly effective in separating nitrogen gas from air.

1 Claim, 5 Drawing Sheets

Apparatus for treating Carbonacious Material with Plasma

Apparatus for treating Carbonacious Material with Plasma

Relationship between Plasma Treatment Time and Gas Adsorption

Relationship between Plasma Treatment Time and Gas Adsorption

Relationship between Plasma Treatment Time and Gas Adsoption

Relationship between Plasma Treatment Time and Gas Adsorption

CARBON MOLECULAR SIEVE

This application is a continuation of application Ser. No. 07/588,851, filed on Sep. 27, 1990, now abandoned.

BACKGROUND OF THE INVENTION

The present invention relates to molecular sieves produced from carbonaceous materials, which have functions of separating mixtures of molecules having different molecular sizes into groups of molecules based on the differences in the selective adsorbability of the molecules.

A variety of processes for producing carbon molecular sieves have been reported since Emmett obtained a carbon molecular sieve by carbonizing polyvinylidene chloride resin (P. H. Emmett: Chme. Rev. 43, page 69). For example, Japanese Patent Publication No. 37036/1974 discloses a process which comprises polymerizing or condensing prepolymer of phenol or furan resin adsorbed on the surface of activated carbon, and then carbonizing the resin thus formed on the surface by heating at 400° to 1000° C. Japanese Patent Publication No. 18675/1977 discloses a process for producing a molecular sieve, which comprises holding a coke having not more than 5% of volatile matters in an inert gas atmosphere at 600° to 900° C., adding a gaseous hydrocarbon that discharges carbon upon thermal degradation, and permitting the carbon that forms by the decomposition to deposit in micropores to decrease the pore diameters. The essential element of this process is to blow a gaseous hydrocarbon into the furnace and to thermally decompose the hydrocarbon at high temperature. Japanese Patent Publication No. 8004/1986 discloses a process which comprises carbonizing pelletized coal, then, after washing the obtained carbon pellets with a mineral acid to remove alkali metal salts, impregnate the granules with 1-3% of coal-tar pitch or coal tar, and heat treating the granules at 950° to 1000° C., followed by cooling in an inert gas atmosphere. Further Japanese Patent Application Laid-open No. 176908/1987 discloses a process for producing a molecular sieve having still higher performance, which comprises using, instead of the coal-tar pitch or coal tar in the above-mentioned process, a fraction of creosote having boiling points of 140° to 260° C., dimethylnaphthalene or xylenol.

Kitagawa (Nenryo Kyokai-Shi, 60 No. 654, 859–864 (1982) describes a process for producing a high-performance molecular sieve which comprises adding 4 to 5% of sulfite pulp waste liquor and coal-tar pitch to Yallourne char powders, pelletizing the mixture and heating the pellets at a constant temperature elevating rate to 600° to 700° C., followed by heat treatment for 1 hour.

SUMMARY OF THE INVENTION

An object of the invention is to provide a newly developed carbon molecular sieve having high performance.

One of the most important uses of carbon molecular sieves is adsorbent for pressure swing adsorption process (hereinafter referred to as PSA). Here, the selective adsorption property of the carbon molecular sieve used as the adsorbent governs the performance of the process.

The present invention provides novel high-performance carbon molecular sieves obtained by treating carbonaceous materials with plasma. For example, a carbonaceous material is treated with the plasma generating by application of high-frequency voltage to a gaseous carbon compound at ordinary temperature and under reduced pressure, whereby the carbonacious material is provided with selective adsorption property, i.e. the property of molecular sieve. Suitably used carbon compounds are toluene, hexane, creosote and the like.

The molecular sieves of the present invention are suited as in adsorbents for separating nitrogen gas from air, which is one of their most important uses.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF PREFERRED EMBODIMENTS

Figure 1:
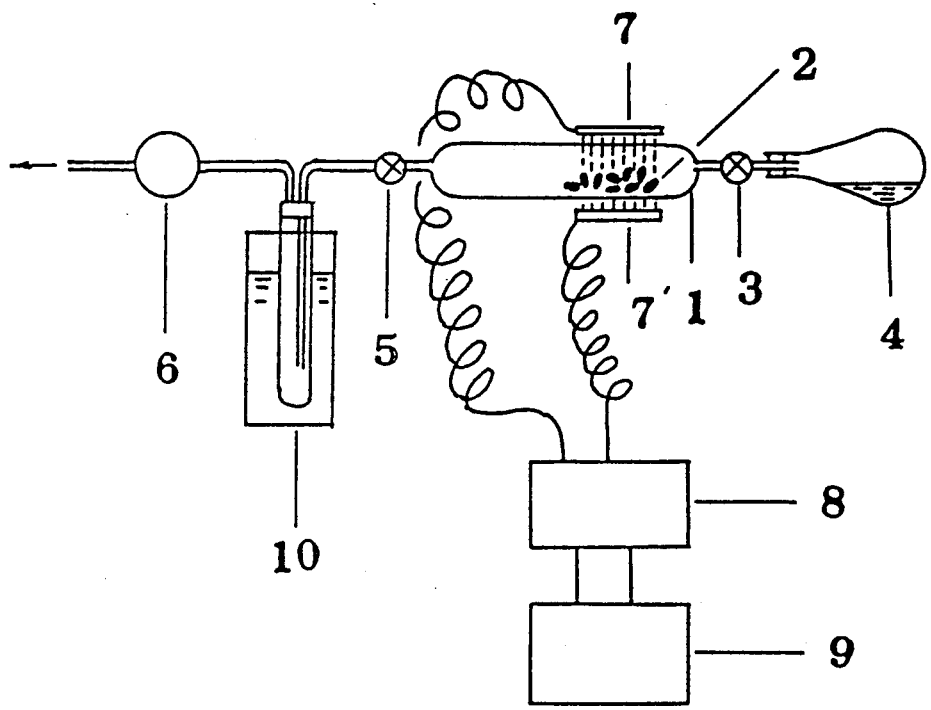
FIG. 1 shows an apparatus for treating carbonacious materials with plasma, where:
1: tubular reactor,
2: carbonacious material,
3: cock,
4: eggplant type flask,
5: cock,
6: vacuum pump.
7 and 7': electrodes,
8: impedance adjustment apparatus,
9: power source for plasma generation, and
10 trap.

The present inventor has studied, for the purpose of checking the action of functional groups present on the surface of activated carbon, on the influence of treatment of this surface with plasma generated from toluene. As a result, the inventor found that the selective adsorption property of activated carbon is significantly enhanced by plasma treatment, and he then tested plasma treatment on various carbonacious base materials, to complete the invention.

Thus, the present invention provides molecular sieves comprising carbonacious materials treated with plasma. Plasmas generated from gaseous carbon compounds are preferably used here, and particularly preferred are those from toluene, hexane and creosote.

The present invention is described in more detail hereinbelow.

Any carbonacious material comprising carbon can be used for the purpose of the invention, and examples of the carbonacious material are charcoal, coal of various types, carbonized coconut shell that is suited as raw material of activated carbon, pelletized carbons comprising the granules obtained from the foregoing and, as required, a binder such as pitch or coal tar and formed into certain shapes, and many like variations. It is known that these carbonacious materials all have micropore structures, which are their characteristics, and that they hence have much larger surface area than other substances and large capacity to adsorb various substances including odorous materials. While activated carbon is one that has been prepared to enhance the adsorptive capacity, all carbon materials, not limited to activated carbon, have micropore structures. The molecular sieve of the present invention are considered to be formed by action of this micropore structure and plasma. This is because that plasma treatment significantly decreases the gas adsorption and increases the property of selective adsorption based on differences in the molecular sizes of the material to be adsorbed, of the carbonacious material to be treated (Example 1).

It is also well known that activated carbon has the largest general adsorptive capacity among carbonacious materials. However, carbonacious materials before activation are more suited than activated carbon as starting material for the molecular sieves used for separating nitrogen from air through PSA apparatus, which is the largest use today for carbon molecular sieves. While the average micropore radius of conventional activated carbon is 10 to 20 A, that of raw carbonacious materials before activation is considered to be about half this value. Since the molecular sizes (the minimum diameter) of oxygen gas and nitrogen gas are 2.8 and 3.0 A respectively, that the raw materials before activation are more suited is understandable from comparison of these two sizes. The molecular sieves obtained from raw carbonacious materials before activation are also suited for separating other gases having a molecular diameter of not more than 5 A. However, molecular sieves prepared from activated carbon are, in most cases, suited for separating substances with large molecular size or using in liquid phase. Amorphous carbon materials, which have comparatively developed micropore structures, are more preferred than carbonacious materials such as graphite that have comparatively smaller micropore structures, since the molecular sieve property originates in the micropore structure of the carbonacious material used.

Fully carbonized products of synthetic resins, particularly phenol resin, are also suitable as starting material for the molecular sieves of the present invention, since they contain almost no impurities and have specific structure resulting from their preparation process.

The carbonacious materials used in the present invention can be of any composition, but in the case of pelletized carbons it is preferred that their binder have also been sufficiently carbonized.

The carbonacious materials can be of any shape, but it is preferred that their average particle size be as small as possible since the effect of plasma is considered to be produced only o the surface of the materials.

The molecular sieves of the present invention are prepared by plasma treatment. The plasma treatment of carbonacious materials decreases the adsorptive capacity and increases the property of selective adsorption based on differences in the molecular sizes of the material to be adsorbed, thus forming molecular sieves.

It is not quite clear as to how the structure of the surface of the carbonacious material treated with plasma changes. However, from the fact that when high frequency voltage is applied to a tubular reactor under reduced pressure the inside of the tube emits faint pink light, it is clear that large amounts of electrons, cations from molecules having lost electrons, radicals formed by splitting of molecules and the like move at high speeds. It is therefore considered that these particles collide onto the surface of the carbonacious materials to form thin membrane, in which the activated plasma particles polymerize with each other to form a solid thin-membrane structure on the surface of the carbonacious materials.

When a mixture of molecules having different molecular sizes is contacted with the thus prepared carbonacious material, the structure formed on the surface of the material shows significantly enhanced property of selective adsorption, i.e. molecular sieve property. For example, when air, which is a mixture of nitrogen and oxygen, is adsorbed on the carbonacious material, the diffusion rates at which the molecules of these two types pass the thin-membrane structure formed on the surface to be finally adsorbed in the micropore structure of the material differ to a great extent from each other due to the difference in their molecular sizes, to which, it is considered, attributable is the significant difference in the adsorption rates of nitrogen and oxygen gases to the carbonacious material. The thought that the molecular sieve property comes from the structure formed on the surface of the material is also supported from the fact that a carbonacious material once prepared in the above-described manner loses its molecular sieve property when it is pulverized. It has been considered that the separation property of carbon molecular sieves is produced by partial filling up of each of micropores. In the present invention, however, in view of the preparation process it is hard to consider that plasma that moves at high speed can penetrate deep into pelletized carbon to partially fill up its micropores. The separation property is therefore considered to be produced by the thin-membrane structure formed on the surface upon collision of high-speed plasma.

Plasma is a highly ionized gas present in, for example, gas between the electrodes of ark discharge, light emitting zone in electric discharge tube and the ionosphere. While these plasmas contain a variety of positive- and negative-charged particles, they are electrically neutral as a whole.

It is known that when a surface is treated with methane plasma in an atmosphere under reduced pressure, a thin membrane of diamond is formed on the surface. This fact shows that plasma has markedly high activity and binding property. It is therefore considered that plasma from a hydrocarbon such as toluene polymerizes on the surface collided to form a solid thin-membrane structure having significantly high molecular weight, and that the structure thus formed has markedly high physical and chemical stabilities.

Explanation is now made with reference to the Examples which will later be described herein in more detail. A carbonacious material was pelletized and the pellets were fully carbonized. The pellets were placed in a pressure test tube and sealed therein, and a small amount of toluene was continuously introduced through one end of the tube. While the inside pressure of the tube was maintained at 1 Torr with a vacuum pump connected to the other end, a high frequency voltage of 13.56 MHz (100 W) was applied to the tube through a pair of copper electrodes holding the tube. Upon application of the voltage the inside of the tube emitted faint violet light, which indicated generation of plasma, and the carbonacious material housed inside was treated with the plasma.

FIGS. 2 through 5 show the relationships between the adsorption times and amounts adsorbed of oxygen gas and nitrogen gas for carbonacious materials plasma treated under various conditions in Examples 1 through 4.

Then, the gas adsorption decreased by plasma treatment as compared with raw materials before treatment. However, while almost no selective adsorption property for oxygen gas and nitrogen gas had been observed before treatment, significant differences in the adsorbability of the two were found after plasma treatment, thus proving the formation of molecular sieves.

Some of our experiments show the cases, where while a considerable selective adsorption property had been formed, the decrease in oxygen gas adsorption was small (Examples 2 and 3). With those carbon molecular sieves prepared by conventional processes, there is recognized the antinomy that if the selective adsorption property is increased, the gas adsorption will decrease, while the increase in the gas adsorption leads to the decrease in the selective adsorption property. However, since our plasma process is novel, the molecular sieve obtained might well exhibit characteristics different from those of conventional carbon molecular sieves.

Any plasma can be used in the present invention insofar as it can form the above-described structure on the surface of carbon materials, and it is not limited to plasma from carbon compounds and can be ones generating from inorganic compounds. Preferably used are, however, plasmas generating from carbon compounds, examples of which are toluene, hexane and creosote, as shown in Examples 1 through 4.

Although, as described in the column "BACK-GROUND OF THE INVENTION", a variety of methods are known for the production of carbon molecular sieves, the formation of molecular sieve property by treating carbonacious materials with plasm is utterly novel.

The molecular sieves, of the present invention, obtained by treating with plasma the surface of carbonacious materials can be used for separation of mixture containing a plurality of molecules having different molecular sizes either in the gaseous phase or in the liquid phase.

The most important field where carbon molecular sieves are being used on industrial scales is adsorbent for PSA apparatus, particularly one for separating nitrogen gas from air. As shown in Examples 2 and 3, the molecular sieves of the present invention are also suitably used for the separation of nitrogen gas from air.

Other features of the invention will become apparent in the course of the following exemplary embodiments which are given for illustration of the invention and are not intended to be limiting thereof.

EXAMPLE 1

FIGURE is an experimental apparatus for treating carbonacious materials with plasma. The tubular reactor 1 is a pressure test tube having a diameter of about 30 mm in which a carbonacious material 2 weighing about 15 g and having a diameter and a length of 2 mm and 5 mm respectively. The eggplant type flask 4 contains a small amount of toluene and connects with the reactor via cock 3. The other end of the reactor connects, via cock 5, to a trap 10 and then to a vacuum pump 6. A pair of discharge electrodes 7 and 7' made of copper are installed, one over and the other under the reactor, and are connected, via an impedance adjustment apparatus 8, with a power source for plasma generation 9 (Type RP-500, 13,56 MHz, 100 w, made by Pearl Kogyo Co., Ltd.)

The carbonacious material used is a fully carbonized pellets obtained by carbonizing at 600° C. pellets molded from a mixture of powder of coconut shell charcoal with coal tar as a binder.

This carbonacious material is placed in the reactor and sealed therein, and the inside of the total system is replaced by nitrogen gas. Then the system is evacuated through the vacuum pump 6. The cock 3 is adjusted such that a small amount of toluene vapor always flows into the reactor, and the cock 5 is so adjusted that the inside of the reactor is kept under a pressure of 1 Torr at a room temperature. The power source 9 is switched on to apply high frequency voltage to the electrodes 7 and 7'. Then, the inside of the reactor emits faint violet light, thus proving generation of plasma, and the carbonacious material in the reactor is treated with toluene plasma.

Figure 2:
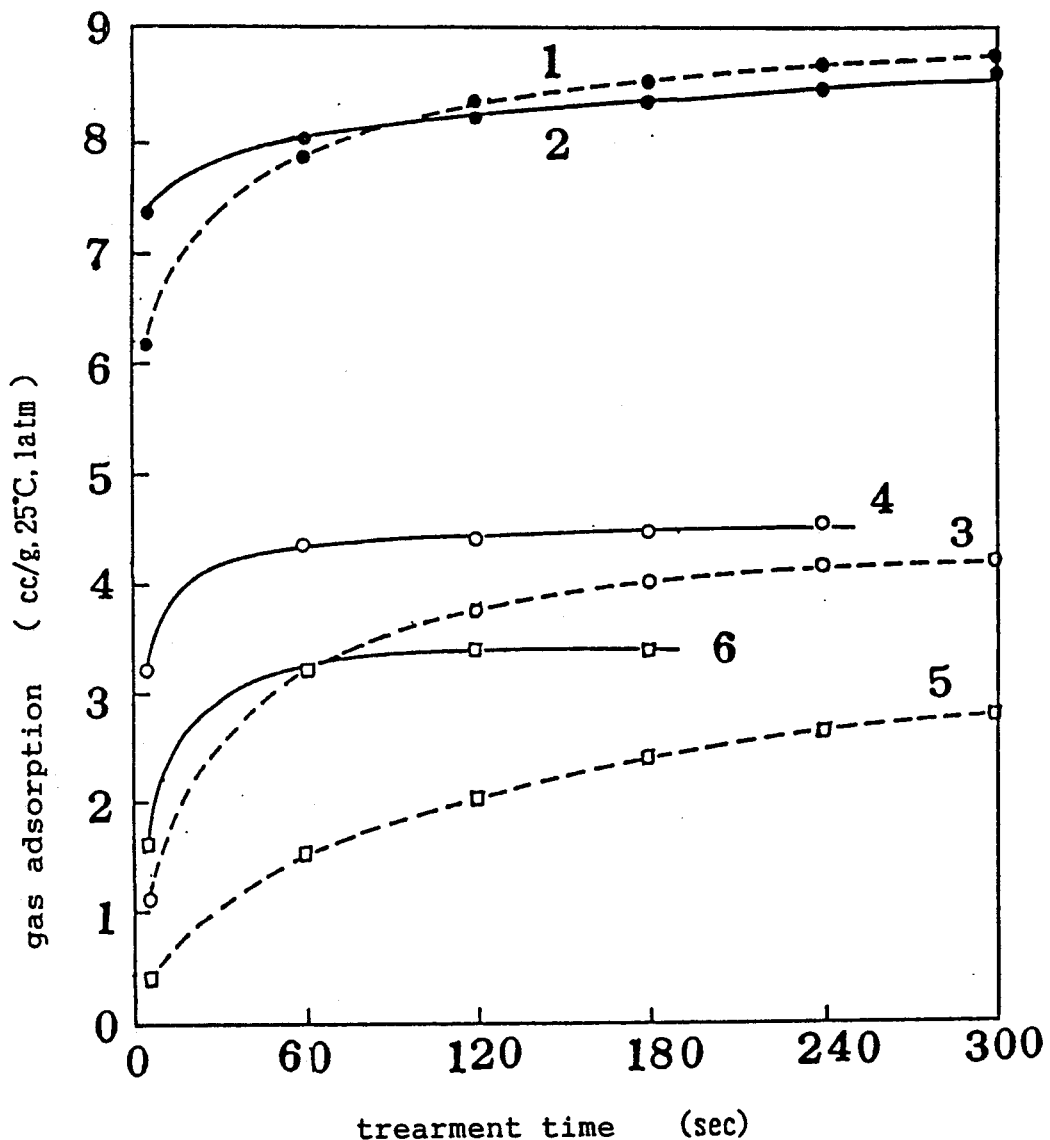
FIG. 2 presents graphs showing the relationship between the plasma treatment time and the adsorptions of nitrogen gas and oxygen gas, in Example 1, where:
1: adsorption of nitrogen gas on carbonacious material before plasma treatment,
2: adsorption of oxygen gas on carbonacious material before plasma treatment,
3: adsorption of nitrogen gas on carbonacious material treated with plasma for 1 minute,
4: adsorption of oxygen gas on carbonacious material treated with plasma for 1 minute,
5: adsorption of nitrogen gas on carbonacious material treated with plasma for 2 minutes, and
6: adsorption of oxygen gas on carbonacious material treated with plasma for 2 minutes.

FIG. 2 shows the relationship between plasma treatment time and the adsorptions of nitrogen gas and oxygen gas at 25° C., 1 atm.

It is seen from this FIGURE that plasma treatment significantly decreased adsorptions of both nitrogen gas and oxygen gas, the decrease in the adsorption of the former being larger, which indicates that the selective adsorption property had been significantly enhanced.

EXAMPLE 2

Coconut shell charcoal powder was blended with coal tar as a binder, and the blend was molded into pellets having a diameter of 2 mm and a length of 5 mm. The pellets were then fully carbonized at 600° C. and then subjected to a treatment for removing alkali metal salts.

The same apparatus as in Example 1 was used. The reactor 1 was charged with 1 g of the carbonacious material prepared above, and the eggplant type flask with a small amount of toluene. Plasma treatment was conducted while the inside of the reactor was maintained under a pressure of 0.5 to 1 Torr at room temperature. For the purpose of applying the plasma thoroughly onto the surface of the carbonacious material, the treatment was interrupted after every 30 seconds' treatment and the reactor was vibrated and rotated to mix the carbonacious material. Other treatment conditions were the same as those in Example 1.

Figure 3:
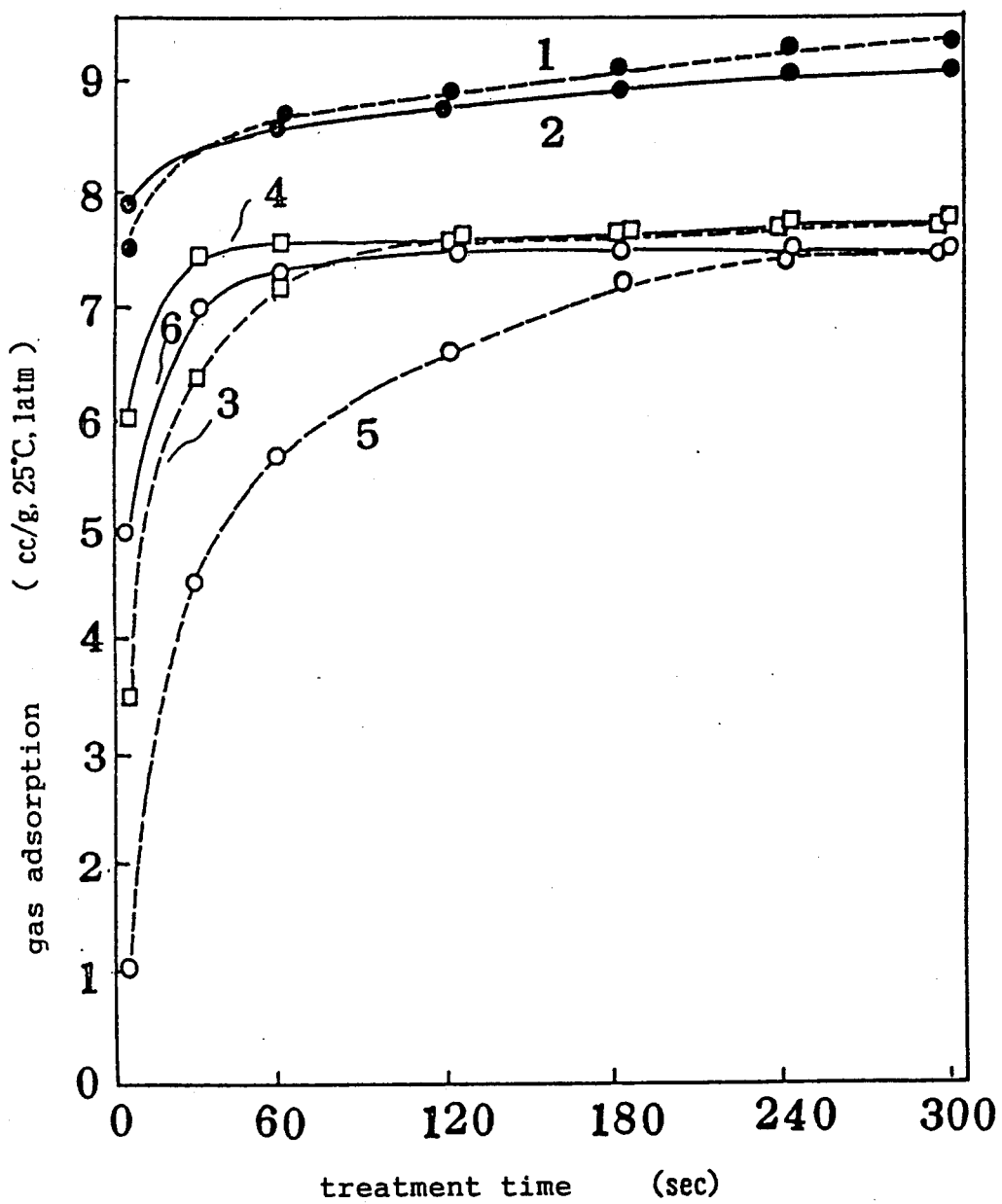
FIG. 3 presents graphs showing the relationship between the plasma treatment time and the adsorptions of nitrogen gas and oxygen gas, in Example 2, where:
1: adsorption of nitrogen gas on carbonacious material before plasma treatment,
2: adsorption of oxygen gas on carbonacious material before plasma treatment,
3: adsorption of nitrogen gas on carbonacious material treated with plasma for 5 minutes,
4: adsorption of oxygen gas on carbonacious material treated with plasma for 5 minutes,
5: adsorption of nitrogen gas on carbonacious material treated with plasma for 7 minutes, and
6: adsorption of oxygen gas on carbonacious material treated with plasma for 7 minutes.

FIG. 3 shows adsorption curves of nitrogen gas and oxygen gas at 25° C., 1 atm versus plasma treatment time for the carbonacious material.

It is seen from this FIGURE that the plasma treatment significantly decreased adsorptions of both nitrogen gas and oxygen gas, the decrease in the adsorption of the former being larger, which indicates that the selective adsorption property had been significantly enhanced.

Many methods may be available for indicating the selective adsorption property. We use the following value as an indication from which the separation ability of a molecular sieve can be judged. Thus, the selective adsorption index, S, is defined as:

$$S = T_{N_2},$$

where $T_{N_2}$ is time (in seconds) required for a molecular sieve to adsorb nitrogen gas in the same amount as that of oxygen gas adsorbed on the sieve at 25° C., 1 atm for 5 seconds.

The carbonacious material obtained by the plasma treatment for 7 minutes showed an S of 7.6 and an equilibrium oxygen adsorption of 7.4 ml/g.

Separation of air was attempted using an pressure swing adsorption test apparatus under the following conditions, to confirm the separation ability for ga resulting from the selective adsorption property.

Adsorption column: 10 ml., 2 pieces
Adsorption pressure: 3.5 kg/cm$^3$ (G)
Desorption pressure: 100 mmHg
Adsorption time and desorption time: 40 seconds each
Gas space velocity (SV): 0.6
where SV is the quotient obtained by dividing the volume of nitrogen gas flow per minute under normal condition by the volume filled per adsorption column.

The separation test conducted with the carbon molecular sieve obtained by the plasma treatment for 7 minutes yielded a nitrogen gas having a concentration of 92.5%. Although it is necessary to take into consideration the fact that the results obtained with a miniature testing apparatus are subject to some data variation, this result clearly shows that the plasma-treated carbon molecular sieve can be used as adsorbent for pressure swing adsorption test apparatus for separating nitrogen gas from air.

EXAMPLE 3

Pellets having a diameter and a length of 2 mm and 5 mm respectively and obtained by carbonizing phenol resin moldings were used. The pellets were plasma treated in the same manner as in Example 2.

Figure 4:
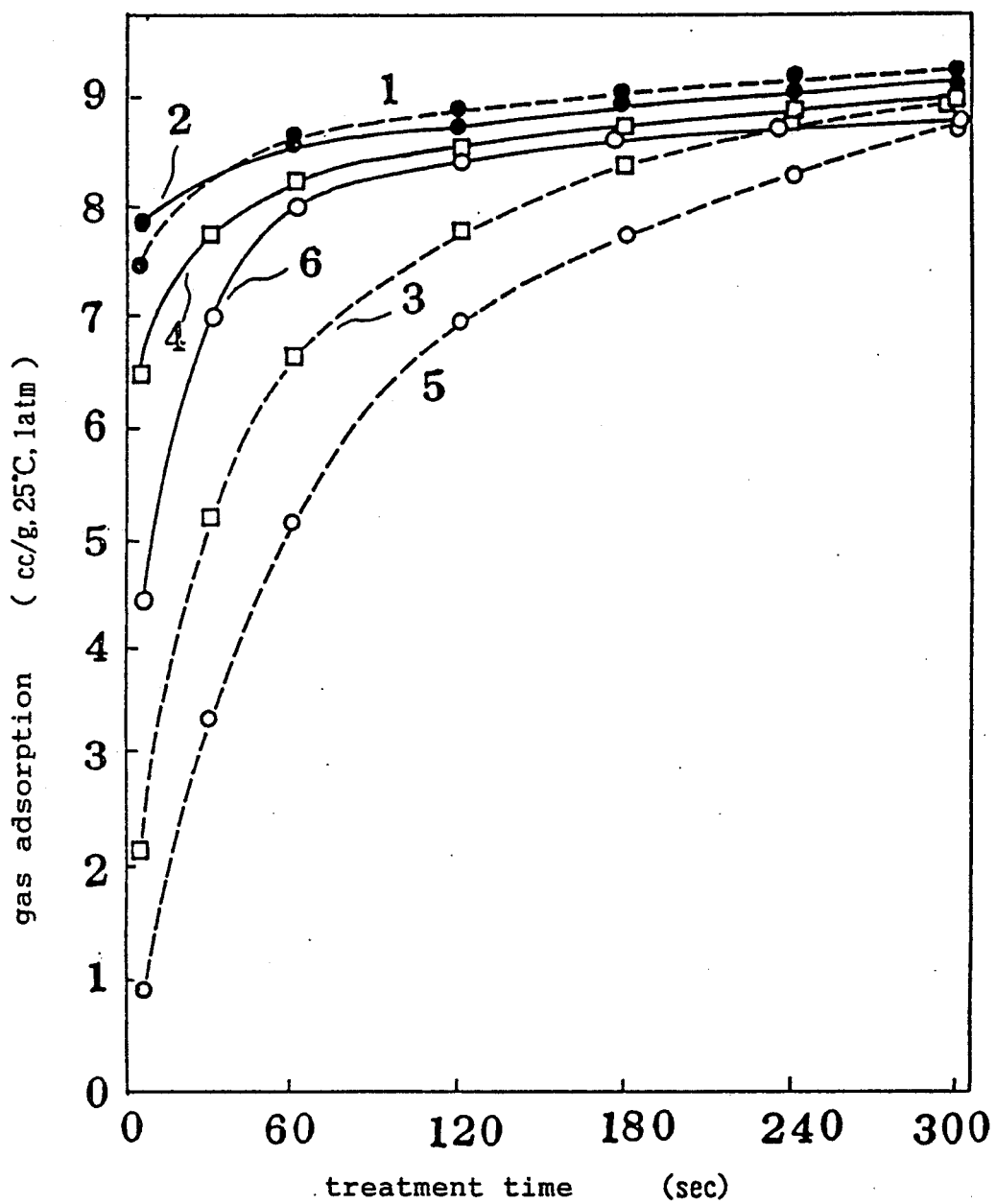
FIG. 4 presents graphs showing the relationship between the plasma treatment time and the adsorptions of nitrogen gas and oxygen gas, in Example 3, where:
1: adsorption of nitrogen gas on carbonacious material before plasma treatment, 2: adsorption of oxygen gas on carbonacious material before plasma treatment,
3: adsorption of nitrogen gas on carbonacious material treated with plasma for 5 minutes,
4: adsorption of oxygen gas on carbonacious material treated with plasma for 5 minutes,
5: adsorption of nitrogen gas on carbonacious material treated with plasma for 7 minutes, and
6: adsorption of oxygen gas on carbonacious material treated with plasma for 7 minutes.
Figure 5:
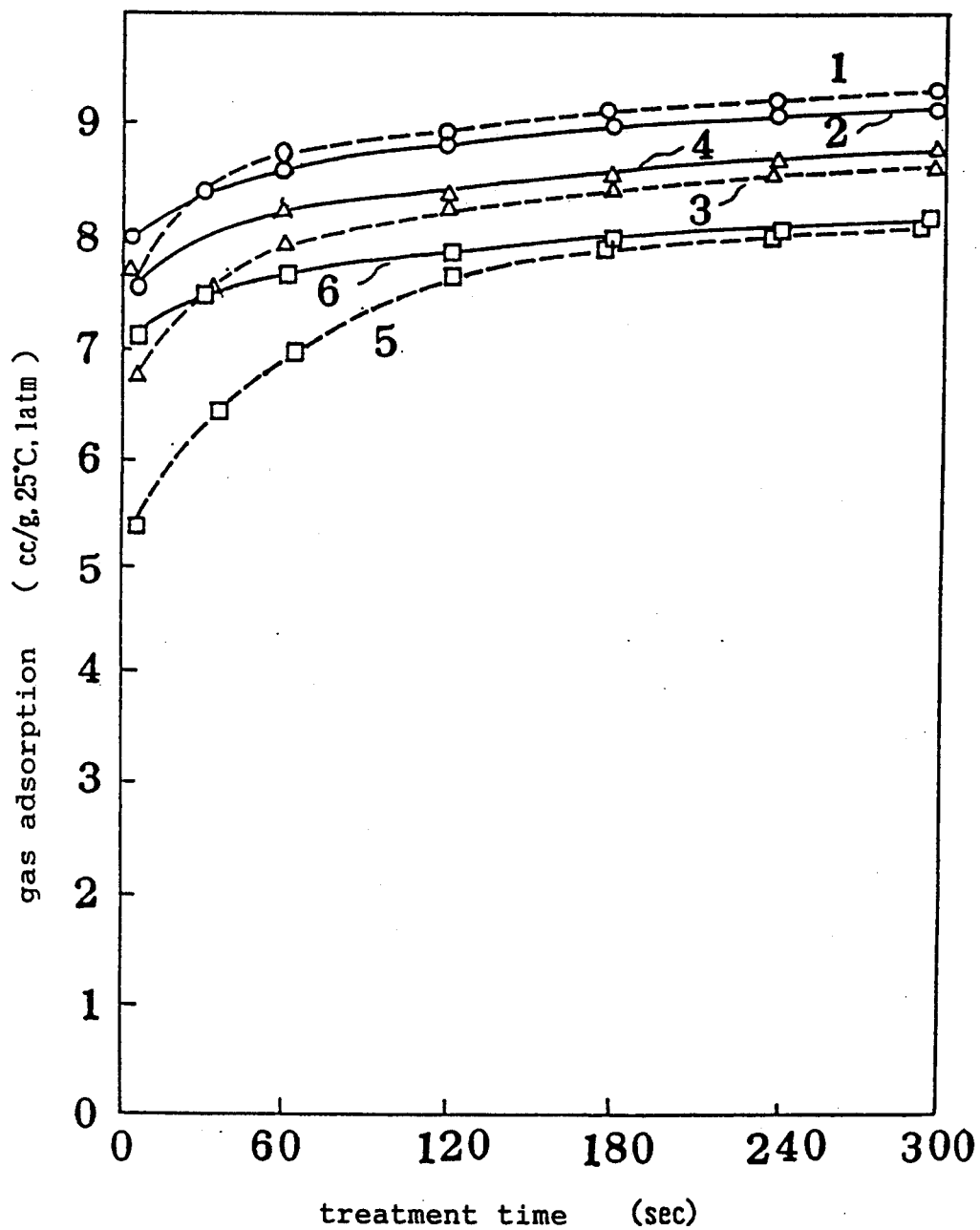
FIG. 5 presents graphs showing the relationship between the plasma treatment time and the adsorptions of nitrogen gas and oxygen gas, in Example 4, where:
1: adsorption of nitrogen gas on carbonacious material before plasma treatment,
2: adsorption of oxygen gas on carbonacious material before plasma treatment,
3: adsorption of nitrogen gas on carbonacious material treated with hexane-plasma,
4: adsorption of oxygen gas on carbonacious material treated with hexane-plasma,
5: adsorption of nitrogen gas on carbonacious material treated with creosote-plasma, and
6: adsorption of oxygen gas on carbonacious material treated with creosote-plasma.

FIG. 4 shows adsorption curves of nitrogen gas and oxygen gas at 25° C., 1 atm versus plasma treatment time for the carbonacious material.

The carbon molecular sieve obtained by treating the carbonacious material with plasma for 7 minutes showed an selective adsorption index S of 10.2 and an equilibrium oxygen adsorption of 8.75 ml/g.

The separation test conducted using a pressure swing adsorption test apparatus with this carbon molecular sieve yielded a nitrogen gas having a concentration of 97.5%.

EXAMPLE 4

The same carbonacious material as used in Example 2 was used, and 2 g each of this material were treated with hexane plasma or creosote plasma for 2 minutes in the same manner as in Example 2.

FIG. 4 shows adsorption curves of nitrogen gas and oxygen gas at 25° C., 1 atm versus plasma treatment time for the carbonacious materials obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing carbon molecular sieves, comprising the steps of treating a fully carbonized pellet with a plasma generated from a carbon compound selected from the group consisting of toluene, hexane, and creosote to produce a carbon molecular sieve having a solid thin-membrane structure on the surface, wherein said carbon molecular sieve has a selective adsorption based on differences in the molecular sizes of the material to be adsorbed.

* * * * *